United States Patent [19]

Ansley

[11] Patent Number: 5,546,202
[45] Date of Patent: Aug. 13, 1996

[54] REAR PROJECTION SCREEN FOR HIGH AMBIENT LIGHT ENVIRONMENTS HAVING A PINHOLE AREA SUBSTANTIALLY EQUAL TO LUMINOUS AREA OF THE LIGHT SOURCE

[75] Inventor: David A. Ansley, Sterling, Va.

[73] Assignee: Hughes Training, Inc., Los Angeles, Calif.

[21] Appl. No.: 261,520

[22] Filed: Jun. 17, 1994

[51] Int. Cl.⁶ .............................................. G02F 1/1335
[52] U.S. Cl. .................. 359/40; 359/41; 359/49; 359/63
[58] Field of Search .................. 359/40, 41, 63, 359/49

[56] References Cited

U.S. PATENT DOCUMENTS

| | | | |
|---|---|---|---|
| 2,738,706 | 3/1956 | Thompson | 88/28.93 |
| 3,191,495 | 6/1965 | Miller | 88/28.9 |
| 3,523,717 | 8/1970 | Glenn, Jr. | 350/123 |
| 3,832,032 | 8/1974 | Shimada | 350/128 |
| 4,003,080 | 1/1977 | Maiman et al. | 358/63 |
| 4,172,219 | 10/1979 | Deml et al. | 219/121 |
| 4,298,246 | 11/1981 | Iwamura | 350/122 |
| 4,613,207 | 9/1986 | Fergason | 359/41 |
| 4,666,248 | 5/1987 | van de Ven | 350/128 |
| 4,688,900 | 8/1987 | Doane et al. | 359/52 |
| 4,721,361 | 1/1988 | van de Ven | 350/128 |
| 4,964,695 | 10/1990 | Bradley, Jr. | 350/129 |
| 5,150,138 | 9/1992 | Nakanishi et al. | 359/40 |
| 5,353,133 | 10/1994 | Bernkopf | 359/41 |

*Primary Examiner*—Anita Pellman Gross
*Assistant Examiner*—Fetsum Abraham
*Attorney, Agent, or Firm*—Jeannette M. Walder; Wanda K. Denson-Low

[57] ABSTRACT

In a display system suitable for high ambient light environments, a lamp is used simply as a light source to illuminate a rear projection display screen, which is a matrix of tiny cells that modulate the light at video rates. Each cell includes a polymer dispersed liquid crystal (PDLC), a focusing lens and a pinhole aperture. When the PDLC is electrically activated, light passing through the PDLC is scattered in many directions, and very little light passes through the pinhole aperture and is seen by the viewer. When the PDLC is not electrically activated, light passing through the PDLC is not scattered, the lens of each cell focuses the light through the pinhole aperture, and the viewer sees a bright spot of light.

26 Claims, 2 Drawing Sheets

5,546,202

REAR PROJECTION SCREEN FOR HIGH AMBIENT LIGHT ENVIRONMENTS HAVING A PINHOLE AREA SUBSTANTIALLY EQUAL TO LUMINOUS AREA OF THE LIGHT SOURCE

TECHNICAL FIELD OF THE INVENTION

This invention relates to video displays, and more particularly to an improved high brightness electronic display for high ambient light environments.

BACKGROUND OF THE INVENTION

A conventional display consists of a projector and a screen. The problem with conventional projectors is that they are not bright enough. Typically, only about 5% of the light from the projector lamp reaches the screen. The other 95% of the light is lost inside the projector.

One exemplary type of conventional projector used for high ambient light environments is the liquid crystal light valve projector. Light from the projector lamp is collimated and linearly polarized prior to illuminating the liquid crystal video display. Next, the light passes through a second polarizer (called an analyzer). The analyzer polarization axis is rotated 90 degrees with respect to the light polarization axis. Thus, the light is blocked. However, activating the liquid crystal causes the light polarization axis to rotate which allows some of the light to pass through the analyzer. The greater the activation of the liquid crystal, the greater the rotation of the polarization axis of the light and the greater the percentage of light that passes through the analyzer. In other words, the liquid crystal is not activated in the regions of the video display that are black. The liquid crystal is activated to its maximum in the regions of the video display that are white. Most of the 95% light loss occurs in the collimation optics and two polarizers. A high degree of collimation is required; otherwise the liquid crystal does not function properly. The brightest liquid crystal light valve projectors output approximately 3,500 lumens. For a 9×12 foot display with a screen gain of five, the display brightness is only 160 foot Lamberts. This is too low for high ambient light environments (10,000 foot Lamberts).

Another type of projection apparatus designed for outdoor electronic signs uses a matrix of miniature projection-type cathode ray tubes (CRTs). While this type of projector produces a bright display, there are high cost and maintenance problems associated with miniature CRTs.

SUMMARY OF THE INVENTION

A rear projection display system is described which is suitable for use in high ambient light environments. The display system includes a light source such as a lamp, and means for directing light generated by the light source toward a display screen. The display screen comprises a matrix of tiny cells. Each cell includes an electrically activated light scattering element. The element, when electrically activated, scatters light incident thereon from the light source in many directions, and passes light therethrough without scattering when not electrically activated. Each cell further includes a lens element for focussing non-scattered light passing through the light scattering element at a focus point within a focal plane, and an opaque screen surface having a pinhole aperture located at the lens focus point. A driver system selectively electrically activates the light scattering elements of the matrix of cells, wherein light passing through the electrically activated light scattering elements is scattered in many directions and very little light passes through the pinhole to a viewer, and light passing through light scattering elements which are not electrically activated is not scattered and focused through the pinhole, so as to form a desired image. The screen provides a means for modulating the light at video rates.

In a preferred embodiment, the light scattering elements each comprise a polymer dispersed liquid crystal (PDLC) element, the light source comprises a lamp element, and the means for directing light from the light source onto the screen includes a light reflector element.

The means for directing light from the light source onto the screen includes a light collimator for collimating light from the light source into a collimated beam to be directed onto the screen. In this case, all of the cells comprising the matrix are identical.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

In this invention, the conventional projector of the conventional system is eliminated. A lamp is used simply as a light source to illuminate a display screen, which is a matrix of tiny cells that modulate the light at video rates. Each cell includes an electrically activated light scattering element, such as polymer dispersed liquid crystal (PDLC) material, a focusing lens and a pinhole aperture. When the PDLC is electrically activated, light passing through the PDLC is scattered in many directions, and very little light passes through the pinhole aperture and is seen by the viewer. When the PDLC is not electrically activated, light passing through the PDLC is not scattered. The lens of each cell focuses the light through the pinhole aperture and the viewer sees a bright spot of light. It is estimated that about 50% of the light from the lamp will reach the screen because the invention uses scattering rather than polarization methods. Another reason for the high efficiency is that the light does not have to pass through a complicated condenser/projector optical system as in conventional systems. Thus, for a given sized light source, it is estimated that the brightness of a display embodying this invention may be as much as ten times brighter than conventional displays.

Figure 1:
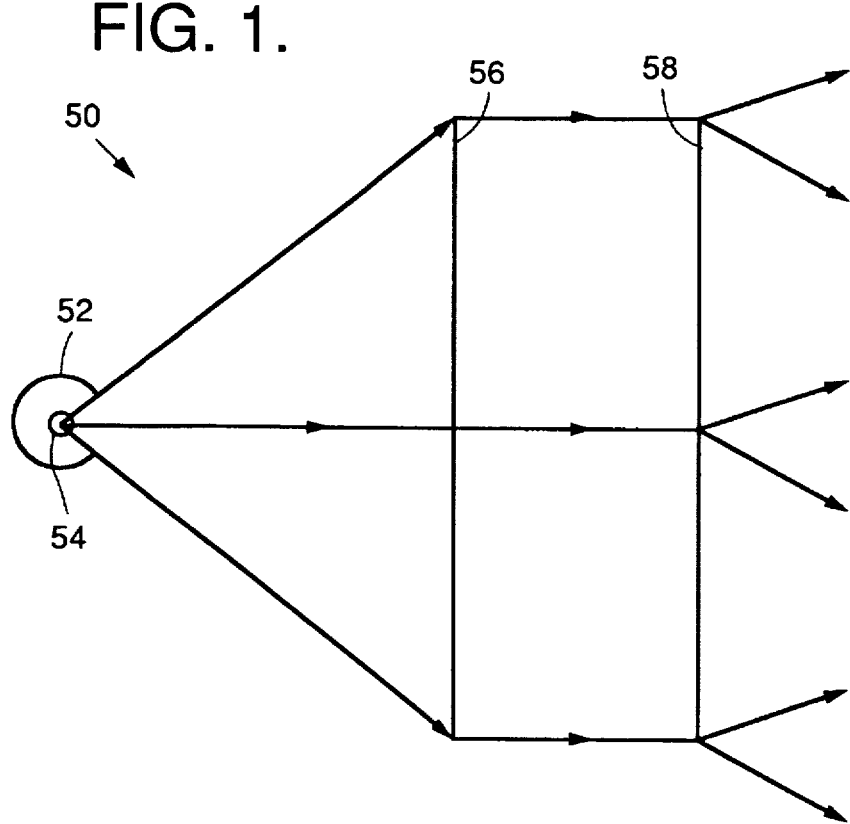
FIG. 1 is a schematic diagram showing components of a display system embodying the invention.

FIG. 1 shows a display system 50 embodying the invention. A reflector 52 surrounding most of the lamp 54 directs the light toward a collimator 56, which collimates the light from the lamp 54 into a beam directed onto a screen 58. A xenon lamp, preferably one having a small spherical luminous area on the order of 0.5–1 mm, is suitable for the lamp 54. A metal halide lamp could also be used; however, the luminous area is larger (2–8 mm)). The size of the pinhole is a function of the size of the luminous area of the lamp 54. The larger the luminous area, the larger the pinhole must be. The larger the pinhole, the more scattered light that escapes through the pinhole and, hence, the contrast ratio will be lower. Also, more ambient light will enter the larger pinhole and it will be reflected back to the viewer. If the luminous area of the lamp is elongated or tubular, the pinhole will also be elongated or tubular.

Preferred collimators suitable for the purpose include Fresnel, kinoform, binary optic or diffractive/holographic collimators. It should be noted that use of a collimator is optional in the practice of this invention. The benefit of the collimator is that all cells in the screen matrix are identical if a collimator is used.

If a collimator is not used, the lens spacing between lens in adjacent cells comprising the screen can be constant, and the spacing of the pinholes should increase from the center of the screen to the perimeter. Conversely, the pinhole spacing can be constant while the lens spacing decreases from the center of the screen to the perimeter. In other words, if a collimator is not used, the angle that the light enters each lens is a function of the lens location. The angle is zero degrees at the center of the screen. The angle increases with increasing distance from the center of the screen. Light that enters a lens at an angle other than zero degrees will focus to a point that is located some distance from the optical axis of the lens. Only light that enters the lens at zero degrees angle focuses on the optical axis. The pinhole should be placed at the focus point of the lens.

Figure 2A:
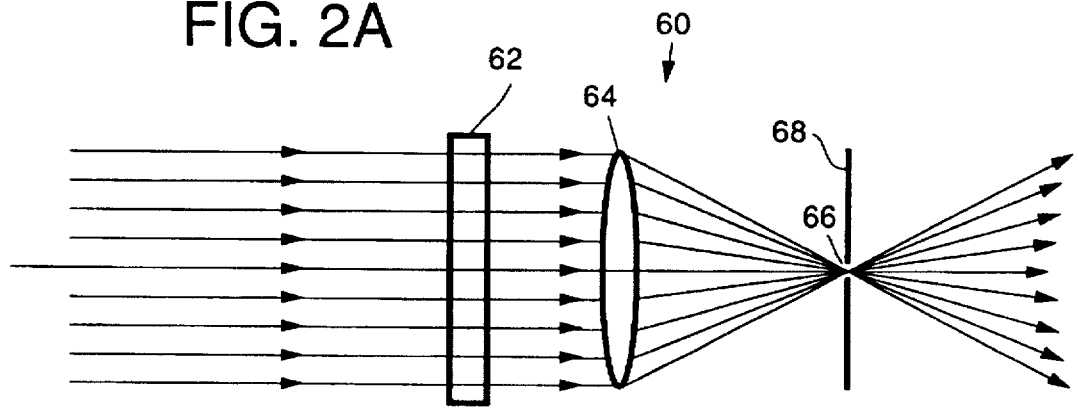
FIG. 2 illustrates an exemplary cell comprising the display screen of the system of FIG. 1, with the PDLC element in the non-scattering mode.
FIG. 2B illustrate the exemplary cell with the PDLC element in the scattering mode.
Figure 2B:
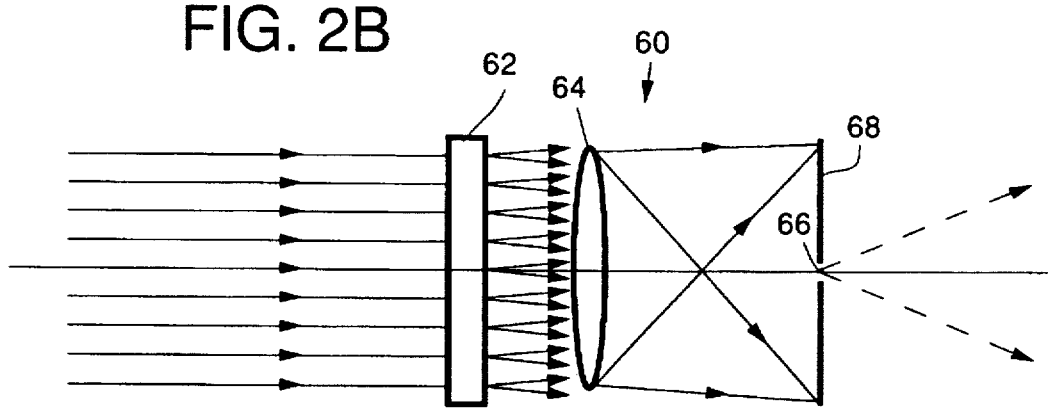

The screen 58 is a matrix of tiny cells. FIGS. 2A and 2B illustrate the operation of one exemplary cell 60 comprising the screen 58. Each cell 60 has three components in this embodiment, an electrically activated light scattering element, in this embodiment a polymer dispersed liquid crystal (PDLC) 62, a focusing microlens 64, and a pinhole aperture 66 in an opaque (preferably black) surface 68.

When the PDLC 62 is in the non-scattering state, as illustrated in FIG. 2A, the colliminated light from the lamp 54 is passed through lens 64, which focuses the light to a point at the pinhole 66, and the light passes through the pinhole 66 and is seen by the viewer. The diameter of the point is a function of the size of the luminous area of lamp 54, the focal length of the collimator 56, the focal length of the microlens 64 and the wavelength of the light. It should be noted that the area of the pinhole 66 is typically less than 1% as large as the cell area of the opaque surface 68. Thus, if the opaque surface is painted black, very little ambient light is reflected back toward the viewer.

When the PDLC 62 is in the scattering state, as illustrated in FIG. 2B, light is scattered in many directions. Most of the light is blocked by the opaque surface 68. Very little light passes through the pinhole 66. The design goal in this exemplary application is to allow less than 1% of the light to pass through the pinhole 66 when the PDLC 62 is in the scattering state. Therefore, the contrast ratio of the display will be approximately 100:1.

Figure 3:
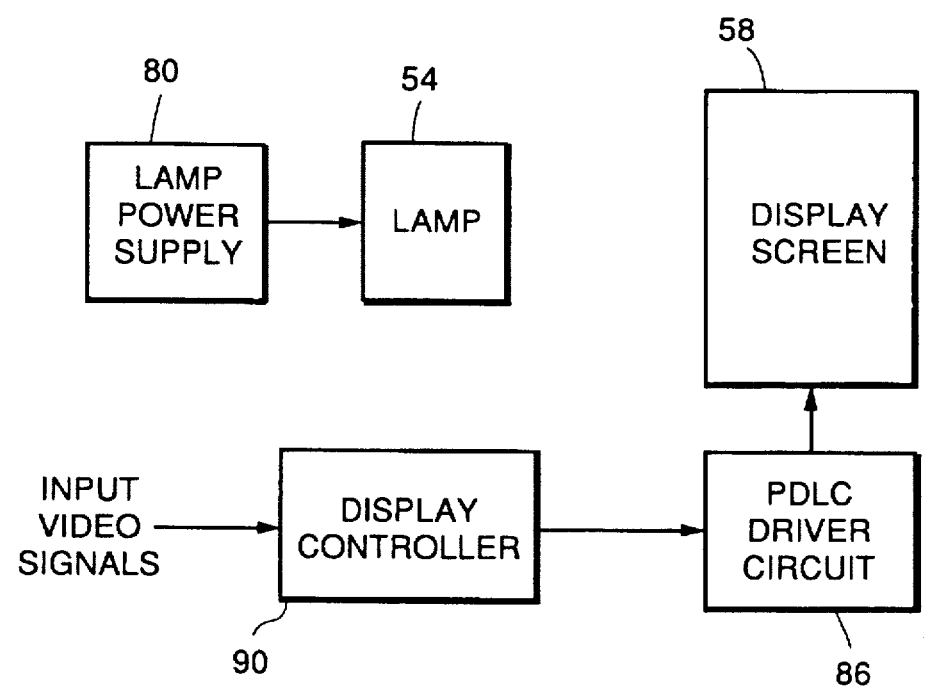
FIG. 3 is a block diagram of the display system of FIG. 1.

FIG. 3 is a block diagram of electrically operated elements of the display system 50. The lamp 54 is powered by a lamp power supply 80. The cells of the display screen 58 are electrically actuated by a PDLC driver circuit 86, under control of the display controller 90. The controller 90 acts in response to input video signals to actuate the matrix of cells to display the image defined by the input video signals.

Driver circuits for PDLC materials are well known in the art. Such driver circuits conventionally include a transistor and capacitor located at each cell, and an X-Y grid of electrodes used to electrically activate the transistor by storing a charge on the capacitor. The amount of charge that is placed on the capacitor affects the degree that the transistor is "turned on." If the transistor is fully turned on, the PDLC is subjected to maximum electric field and becomes fully scattering. If the transistor is not turned on, the PDLC is subjected to minimum electric field and does not scatter.

In one exemplary implementation, the X-Y grid is silk screened onto a plastic sheet, such as a Mylar sheet. The transistors and capacitors are wire bonded onto the X-Y grid. The lens and pinhole array can be made by injection molding. The Mylar sheet and lens/pinhole array will be laminated together to form the finished screen.

There are various kinds of PDLCs. Some scatter light when excited by electrical voltage. Some scatter light when electrical voltage is removed. Either type can be used in the practice of this invention.

Consider an exemplary design for a 9×12 foot screen. Assuming 375×500 pixel resolution, each cell 60 will be 0.288×0.288 inches. This size of the cell 60 will provide eye limiting resolution at a viewing distance of 82.5 feet or greater. The total number of cells will be 187,500. The focal length of the lens 64 is a function of the desired viewing angle. For a viewing angle of ±30 degrees, the focal length of the lens will be 0.2494 inches, for this example. The microlens 64 is simply a small lens. The preferred manner of constructing the lens is injection molding.

Only one lamp is required per 9×12 foot screen. Otherwise, the screen would have to have a set of pinholes for each lamp. In other words, multiple lamps would result in multiple images on surface 68. Each lamp would be imaged to a slightly different location on surface 68 depending on the physical separation of each lamp.

For a color display, the size of each cell in this exemplary 9×12 foot screen will be 0.096×0.288 inches. For the same focal length lens, the viewing angle in the vertical direction will be ±10.9 degrees. The total number of cells will be 562,500. Thus, the color display system increases the number of cells by a factor of three for the same resolution, with one sub-cell for red, one sub-cell for green, and one sub-cell for blue. Although filters could be used to ensure that the respective sub-cells pass only the desired light color, using a filter is inefficient. Two-thirds of the light is absorbed/reflected by the filter. It is preferred to use a prism (or hologram) preceding each cell to spread the light into a spectrum so that the red light passes through the red cell, the green light passes through the green cell and the blue light passes through the blue cell.

Figure 4:
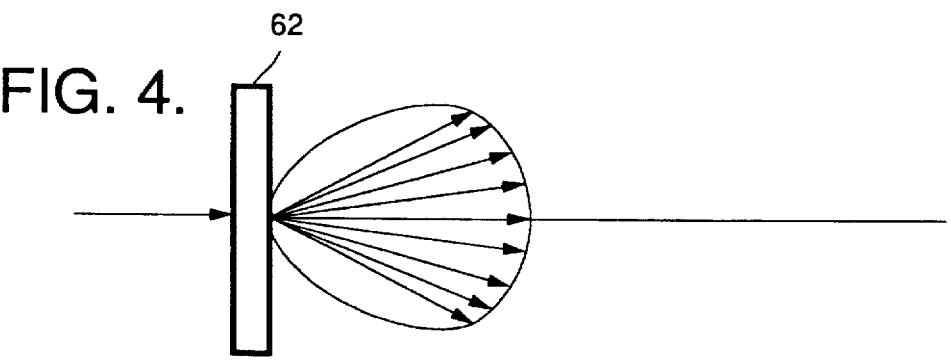
FIG. 4 shows the desired scatter distribution when the PDLC element is fully scattering.
Figure 5:
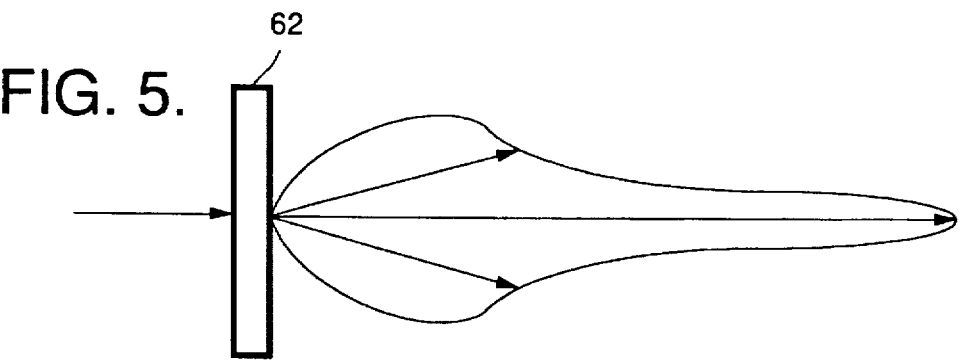
FIG. 5 shows the scatter distribution when the PDLC is partially scattering, i.e., when the voltage applied to the PDLC is less than the maximum (minimum).

FIG. 4 shows the desired scatter distribution when the PDLC 62 is fully scattering. FIG. 5 shows the scatter distribution when the PDLC 62 is partially scattering. In other words, the voltage applied to the PDLC is less than maximum (minimum). This is how grey scale is obtained. The applied voltage changes the scatter distribution (angle) which affects the percentage of light that passes through the pinhole.

It is understood that the above-described embodiments are merely illustrative of the possible specific embodiments which may represent principles of the present invention. For example, light scattering materials other than PDLC could be used in the cells of the display screen, such as liquid crystal materials known as "dynamic scatterers." Other arrangements may readily be devised in accordance with these principles by those skilled in the art without departing from the scope and spirit of the invention.

What is claimed is:

1. A rear projection display system, comprising:
   a light source;
   means for directing light generated by said light source toward a display screen;
   said display screen comprising a matrix of small cells, each cell representing a display pixel which is selectively illuminated, each cell comprising:
   an electrically activated cell light scattering element, said element when a first operating mode for scattering light incident thereon from the light source, said element passing light therethrough without scattering when in a second operating mode;
   a cell lens element for focussing non-scattered light passing through said light scattering element at a focus point within a focal plane;
   a cell opaque screen portion having a pinhole aperture located at said focus point of said lens element;
   each cell having individual ones of said cell light scattering elements, cell lens elements and cell opaque screen portions; and
   wherein said pinhole aperture covers a pinhole area, said lamp defines a luminous area, and wherein said pinhole area is substantially equal to said luminous area of said lamp; and
   a driver system for selectively electrically activating said light scattering elements of said matrix of cells to selectively operate the respective cells in said first or second operating mode to modulate the intensity of light passing through said cells, wherein light passing through light scattering elements operating in said first mode is scattered in many directions and very little light passes through the pinhole to a viewer, and light passing through light scattering elements operating in said second operating mode is not scattered and focused through the pinhole, so as to form a desired image defined by said display pixels represented by the cells of the matrix.

2. The display system of claim 1 wherein said light scattering elements of said cells each comprise a polymer dispersed liquid crystal (PDLC) element.

3. The display system of claim 2 wherein said driver system selectively electrically activates said cells to modulate said light intensity at video rates.

4. The display system of claim 2 wherein said driver system selectively electrically activates said cells to modulate said light intensity at video rates.

5. The display system of claim 1 wherein said light source comprises a lamp element, and said means for directing light from said light source onto said screen includes a light reflector element.

6. The display system of claim 1 wherein said means for directing light from said light source onto said screen includes a light collimator for collimating light from the light source into a collimated beam to be directed onto said screen.

7. The display system of claim 6 wherein all of said cells comprising said matrix are identical.

8. The display system of claim 1 wherein said light source is a single lamp.

9. The display system of claim 8 wherein said lamp has a spherical luminous area.

10. The display system of claim 1 wherein each cell of said display screen covers a cell area, said pinhole covers a pinhole area comprising said cell area, and wherein said pinhole area is no more than 1% of said cell area.

11. The display system of claim 1 wherein said opaque screen includes an external screen surface facing a viewer, and said screen surface is black to minimize reflection of ambient light back to the viewer.

12. The display system of claim 1 wherein said pinhole aperture covers a pinhole area which is small in relation to a display screen cell area to minimize reflection of ambient light from said lens element back to a viewer.

13. The display system of claim 1 wherein the light directed toward the display screen is uncollimated, and wherein an inter-cell spacing of said cell lens elements across said display screen is constant, and an inter-cell spacing of said cell pinhole apertures is varied across said display screen.

14. The display system of claim 1 wherein the light directed toward the display screen is uncollimated, and wherein an inter-cell spacing of said cell pinhole apertures is constant, and an inter-cell spacing of said cell lens elements is varied across said screen.

15. A rear projection display system, comprising:
   a lamp for generating display illumination light;
   a reflector for directing light generated by said light source toward a light collimator;
   said light collimator for collimating incident light from said lamp and directing the collimated light onto a display screen;
   said display screen comprising a matrix of small cells, each cell representing a display pixel which is selectively illuminated, each cell comprising:
   an electrically activated cell light scattering element, said element when in a first operating mode for scattering light incident thereon from the light source, said element passing light therethrough without scattering when in a second operating mode;
   a cell lens element for focussing non-scattered light passing through said light scattering element at a focus point within a focal plane;
   a cell opaque screen portion having a pinhole aperture located at said focus point of said lens element, wherein said opaque screen portion includes an external screen surface facing a viewer, and said screen surface is black to minimize reflection of ambient light back to the viewer;
   each cell having individual ones of said cell light scattering elements, cell lens elements and cell opaque screen portions; and
   a driver system for selectively electrically activating said light scattering elements of said matrix of cells to selectively operate the respective cells in said first or second operating mode to modulate the intensity of light passing through said cells, wherein light passing through light scattering elements operating in said first mode is scattered in many directions and very little light passes through the pinhole to a viewer, and light passing through light scattering elements operating in said second operating mode is not scattered and focused through the pinhole, so as to form a desired image defined by said display pixels represented by the cells of the matrix.

16. The display system of claim 15 wherein said light scattering elements of said cells each comprise a polymer dispersed liquid crystal (PDLC) element.

17. The display system of claim 15 wherein all of said cells comprising said matrix are identical.

18. The display system of claim 15 wherein said lamp has a small spherical luminous area.

19. The display system of claim 15 wherein said lamp is a high intensity lamp and said projection system is suited for high ambient light environments.

20. The display system of claim 15 wherein said pinhole aperture covers a pinhole area, said lamp defines a luminous area, and wherein said pinhole area is substantially equal to said luminous area of said lamp.

21. The display system of claim 15 wherein each cell of said display screen covers a cell area, said pinhole covers a pinhole area comprising said cell area, and wherein said pinhole area is no more than 1% of said cell area.

22. The display system of claim 15 wherein said pinhole aperture covers a pinhole area which is small in relation to a display screen cell area to minimize reflection of ambient light from said lens element back to a viewer.

23. A rear projection display system, comprising:

a light source;

means for directing light generated by said light source toward a display screen;

said display screen comprising a matrix of small cells, each cell representing a display pixel which is selectively illuminated, each cell comprising:

an electrically activated cell light scattering element, said element when a first operating mode for scattering light incident thereon from the light source, said element passing light therethrough without scattering when in a second operating mode;

a cell lens element for focussing non-scattered light passing through said light scattering element at a focus point within a focal plane;

a cell opaque screen portion having a pinhole aperture located at said focus point of said lens element, said opaque screen portion including an external screen surface facing a viewer, and wherein said screen surface is black to minimize reflection of ambient light back to the viewer;

each cell having individual ones of said cell light scattering elements, cell lens elements and cell opaque screen portions; and a driver system for selectively electrically activating said light scattering elements of said matrix of cells to selectively operate the respective cells in said first or second operating mode to modulate the intensity of light passing through said cells, wherein light passing through light scattering elements operating in said first mode is scattered in many directions and very little light passes through the pinhole to a viewer, and light passing through light scattering elements operating in said second operating mode is not scattered and focused through the pinhole, so as to form a desired image defined by said display pixels represented by the cells of the matrix.

24. A rear projection display system, comprising:

a light source;

means for directing light generated by said light source toward a display screen, wherein the light directed toward the display screen is uncollimated;

said display screen comprising a matrix of small cells, each cell representing a display pixel which is selectively illuminated, each cell comprising:

an electrically activated cell light scattering element, said element when a first operating mode for scattering light incident thereon from the light source, said element passing light therethrough without scattering when in a second operating mode;

a cell lens element for focussing non-scattered light passing through said light scattering element at a focus point within a focal plane;

a cell opaque screen portion having a pinhole aperture located at said focus point of said lens element;

each cell having individual ones of said cell light scattering elements, cell lens elements and cell opaque screen portions; and wherein an inter-cell spacing of said cell lens elements across said display screen is constant, and an inter-cell spacing of said cell pinhole apertures is varied across said display screen; and a driver system for selectively electrically activating said light scattering elements of said matrix of cells to selectively operate the respective cells in said first or second operating mode to modulate the intensity of light passing through said cells, wherein light passing through light scattering elements operating in said first mode is scattered in many directions and very little light passes through the pinhole to a viewer, and light passing through light scattering elements operating in said second operating mode is not scattered and focused through the pinhole, so as to form a desired image defined by said display pixels represented by the cells of the matrix.

25. A rear projection display system, comprising:

a light source;

means for directing light generated by said light source toward a display screen, wherein the light directed toward the display screen is uncollimated;

said display screen comprising a matrix of small cells, each cell representing a display pixel which is selectively illuminated, each cell comprising:

an electrically activated cell light scattering element, said element when a first operating mode for scattering light incident thereon from the light source, said element passing light therethrough without scattering when in a second operating mode;

a cell lens element for focussing non-scattered light passing through said light scattering element at a focus point within a focal plane;

a cell opaque screen portion having a pinhole aperture located at said focus point of said lens element;

each cell having individual ones of said cell light scattering elements, cell lens elements and cell opaque screen portions; and wherein an inter-cell spacing of said cell pinhole apertures is constant, and an inter-cell spacing of said cell lens elements is varied across said screen; and a driver system for selectively electrically activating said light scattering elements of said matrix of cells to selectively operate the respective cells in said first or second operating mode to modulate the intensity of light passing through said cells, wherein light passing through light scattering elements operating in said first mode is scattered in many directions and very little light passes through the pinhole to a viewer, and light passing through light scattering elements operating in said second operating mode is not scattered and focused through the pinhole, so as to form a desired image defined by said display pixels represented by the cells of the matrix.

26. A rear projection display system, comprising:

a lamp for generating display illumination light;

a reflector for directing light generated by said light source toward a light collimator;

said light collimator for collimating incident light from said lamp and directing the collimated light onto a display screen;

said display screen comprising a matrix of small cells, each cell representing a display pixel which is selectively illuminated, each cell comprising:

an electrically activated cell light scattering element, said element when in a first operating mode for scattering light incident thereon from the light source, said element passing light therethrough without scattering when in a second operating mode;

a cell lens element for focussing non-scattered light passing through said light scattering element at a focus point within a focal plane;

a cell opaque screen portion having a pinhole aperture located at said focus point of said lens element;

each cell having individual ones of said cell light scattering elements, cell lens elements and cell opaque screen portions; and wherein said pinhole aperture covers a pinhole area, said lamp defines a luminous area, and wherein said pinhole area is substantially equal to said luminous area of said lamp; and a driver system for selectively electrically activating said light scattering elements of said matrix of cells to selectively operate the respective cells in said first or second operating mode to modulate the intensity of light passing through said cells, wherein light passing through light scattering elements operating in said first mode is scattered in many directions and very little light passes through the pinhole to a viewer, and light passing through light scattering elements operating in said second operating mode is not scattered and focused through the pinhole, so as to form a desired image defined by said display pixels represented by the cells of the matrix.

* * * * *